United States Patent
Nagase

(10) Patent No.: US 9,715,263 B2
(45) Date of Patent: Jul. 25, 2017

(54) BMC PROCESSING CIRCUIT, USB POWER DELIVERY CONTROLLER, BMC RECEPTION METHOD, AND NON-TRANSITORY COMPUTER READABLE MEDIUM STORING BMC RECEPTION PROGRAM

(71) Applicant: RENESAS ELECTRONICS CORPORATION, Tokyo (JP)

(72) Inventor: Toshiyuki Nagase, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 14/949,516

(22) Filed: Nov. 23, 2015

(65) Prior Publication Data

US 2016/0254902 A1    Sep. 1, 2016

(30) Foreign Application Priority Data

Feb. 23, 2015 (JP) ................. 2015-033007

(51) Int. Cl.
| | |
|---|---|
| *H04L 7/00* | (2006.01) |
| *G06F 1/28* | (2006.01) |
| *G06F 1/26* | (2006.01) |
| *G06F 13/40* | (2006.01) |
| *H04L 25/49* | (2006.01) |
| *G06F 13/42* | (2006.01) |

(52) U.S. Cl.
CPC ............. *G06F 1/28* (2013.01); *G06F 1/266* (2013.01); *G06F 13/40* (2013.01); *G06F 13/4291* (2013.01); *H04L 25/49* (2013.01)

(58) Field of Classification Search
CPC ... H04L 25/4906; H04L 1/0046; H04L 7/033; H03M 5/12; H03M 13/151
See application file for complete search history.

(56) References Cited

U.S. PATENT DOCUMENTS

| | | | |
|---|---|---|---|
| 5,134,632 A * | 7/1992 | Fletcher | .............. H04L 25/4904 329/313 |
| 6,768,433 B1 * | 7/2004 | Toth | ..................... H03M 1/0626 341/105 |

(Continued)

OTHER PUBLICATIONS

USB Power Delivery Specification, Revision 2.0, Version 1.0, Aug. 2014.*

(Continued)

*Primary Examiner* — Aristocratis Fotakis
(74) *Attorney, Agent, or Firm* — McDermott Will & Emery LLP

(57) ABSTRACT

A BMC processing circuit, a USB power delivery controller, a BMC reception method, and a program capable of achieving stable BMC reception processing with low power consumption are provided. A BMC processing circuit 1100 includes an edge detection unit 1102 that detects change edges of a reception signal encoded by a Biphase Mark Code (BMC) method; an interval measuring unit 1103 that measures an interval value, the interval value being a period between the change edges; a threshold determination unit 1105 that corrects a first threshold using a plurality of interval values to generate a second threshold; and a BMC decoding unit 1107 that decodes the reception signal using the second threshold.

10 Claims, 13 Drawing Sheets

(56) References Cited

U.S. PATENT DOCUMENTS

| | | | |
|---|---|---|---|
| 2006/0002500 A1* | 1/2006 | Kurupati | H03L 7/00 375/371 |
| 2006/0159445 A1* | 7/2006 | Ono | G03B 17/00 396/312 |
| 2011/0261969 A1 | 10/2011 | Elkhatib et al. | |
| 2012/0051465 A1* | 3/2012 | Palaniappan | H04L 7/042 375/340 |
| 2012/0326657 A1* | 12/2012 | Oettinger | H02J 7/025 320/108 |
| 2014/0341264 A1* | 11/2014 | Huang | H04L 25/49 375/226 |
| 2015/0123824 A1* | 5/2015 | Simon | H03M 5/12 341/70 |
| 2015/0207521 A1* | 7/2015 | Waters | H04L 1/0041 714/807 |
| 2015/0304140 A1* | 10/2015 | Duong | H03M 5/12 375/340 |
| 2015/0381317 A1* | 12/2015 | Chard | H03M 13/151 714/776 |
| 2016/0117274 A1* | 4/2016 | Waters | G06F 13/362 710/106 |

OTHER PUBLICATIONS

Vincent Palatin, "USB PD BMC decoder", Chromium OS Reviews, Jun. 2014.*

* cited by examiner

BMC PROCESSING CIRCUIT, USB POWER DELIVERY CONTROLLER, BMC RECEPTION METHOD, AND NON-TRANSITORY COMPUTER READABLE MEDIUM STORING BMC RECEPTION PROGRAM

CROSS-REFERENCE TO RELATED APPLICATIONS

This application is based upon and claims the benefit of priority from Japanese patent application No. 2015-033007, filed on Feb. 23, 2015, the disclosure of which is incorporated herein in its entirety by reference.

BACKGROUND

The present invention relates to a BMC processing circuit, a USB power delivery controller, BMC reception method and program, and relates to, for example, a stable Biphase Mark Code (BMC) reception processing technique with low power consumption.

The USB Power Delivery standard is one for controlling power supply via a USB cable. The USB Power Delivery standard defines that a power supply device (Source) and a power consumption device (Sink) may carry out negotiations regarding power supply by performing information communication using the BMC (BIPHASE MARK CODE) method.

The BMC method is an information transmission method that has been widely used, especially in the field of transmission of audio signals.

For example, the specification of US Patent Application Publication No. 2011/0261969 discloses a method in which a transmission apparatus and a reception apparatus negotiate a synchronization timing using the BMC method according to the SPDIF, ES3 (Audio Engineering Society3) format. Specifically, the reception apparatus determines the synchronization timing to be one of "0.5T", "1T", and "1.5T" according to whether a preamble of a reception packet is "B" (11101000 or 00010111), "M" (11100010 or 00011101), or "W" (11100100 or 00011011).

Further, in the method disclosed in the specification of US Patent Application Publication No. 2011/0261969, the reception apparatus detects a transfer bit rate and a bit boundary by measuring two high periods and two low periods of a reception signal in the preamble of the reception packet (see FIGS. 4A and 4B).

SUMMARY

However, the method disclosed in the specification of US Patent Application Publication No. 2011/0261969 assumes that the preamble of the reception packet has a format defined by the SPDIF and thus the processing flow in the reception apparatus is specialized for the SPDIF. It is therefore impossible to process a reception packet having a preamble in compliance with the USB Power Delivery standard.

Further, in the method disclosed in the specification of US Patent Application Publication No. 2011/0261969, the reception apparatus carries out reception processing using three types of timing parameters of "0.5 T", "1 T", and "1.5 T". Therefore, upon RATE determination, it is required to repeatedly determine whether four signal widths received are included in the range of MIN-MAX defined for each of the three timing parameters of "0.5T", "1T", and "1.5T", and when it is determined that they are included therein, determine which one of the three timing parameters the signal width corresponds to and manage the results of the determination, which makes the process complicated.

Furthermore, in the method disclosed in the specification of US Patent Application Publication No. 2011/0261969, the high period and the low period of the reception signal are separately measured to distinguish bits. The reception apparatus therefore needs to include two separate circuits such as counters to measure periods. This may cause an increase in the size of the reception apparatus and an increase in the power consumption.

In the USB Power Delivery standard, when information communication is performed by the BMC method, a bit rate of data included in a reception packet (fBitRate) is defined to be a minimum 270 Kbps to a maximum 330 Kbps, and the period of the signal indicating data for one bit (tUnitInterval) is defined to be a minimum 3.03 µs to a maximum 3.70 µs. That is, in this standard, there are wide ranges in the bit rate (fBitRate) and the period of the signal for one bit (tUnitInterval).

Therefore, it is required that the reception apparatus in compliance with the USB Power Delivery standard be able to appropriately distinguish bits even when there are variations in the bit rate of the data included in the reception packet or the period of the signal for one bit. Regarding this point, if the sampling clock rate for the reception signal is increased, for example, it is possible to improve the accuracy of distinguishing the bits. However, an increase in the sampling clock rate may cause a disadvantage that power consumption increases.

In addition, due to an influence of a deviation of both GND levels result from a GND bounce of the transmission apparatus and the reception apparatus, a difference in rising and falling delays in the receiver circuit of an LSI of the reception apparatus and the like, the signal width of the bit may change occasionally. Therefore, even when the reception apparatus oversamples the reception signal at a sampling clock rate of 25 MHz, for example, if the bits are distinguished according to a fixed rule (threshold), it is possible that the stable reception state cannot be maintained because of the influence stated above.

It is therefore required that the reception apparatus deal with a wide bit rate (fBitRate) or the period of the signal for one bit (tUnitInterval) without increasing the sampling clock rate and achieve stable reception processing even when the signal width of the bit increases or decreases.

The present invention has been made in order to solve such problems and aims to provide a BMC processing circuit, a USB power delivery controller, a BMC reception method, and a program capable of achieving stable BMC reception processing with low power consumption.

The other problems and the novel characteristics will be made clear from the description of the specification and the accompanying drawings.

In one embodiment, a BMC processing circuit includes: an edge detection unit that detects change edges of a reception signal encoded by a Biphase Mark Code (BMC) method; an interval measuring unit that measures an interval value, the interval value being a period between the change edges; a threshold determination unit that corrects a first threshold using a plurality of interval values to generate a second threshold; and a BMC decoding unit that decodes the reception signal using the second threshold.

In one embodiment, a USB power delivery controller includes: a CC connecting unit that is connected to a communication line of a cable; a VBUS connecting unit that is connected to a power line of the cable; the BMC processing circuit stated above that receives the reception signal from the CC connecting unit; and a controller that performs power control regarding the power line based on the reception signal decoded by the BMC processing circuit.

In one embodiment, a BMC processing method includes: an edge detection step for detecting change edges of a reception signal encoded by a Biphase Mark Code (BMC) method; an interval measuring step for measuring an interval value, the interval value being a period between the change edges; a threshold determination step for correcting a first threshold using a plurality of interval values to generate a second threshold; and a BMC decoding step for decoding the reception signal using the second threshold.

In one embodiment, a program causes a computer to execute the above BMC processing method.

According to the present invention, it is possible to provide a BMC processing circuit, a USB power delivery controller, a BMC reception method, and a program capable of achieving stable BMC reception processing with low power consumption.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Hereinafter, with reference to the drawings, specific embodiments to which the present invention is applied will be described in detail.

<First Embodiment>

First, with reference to FIGS. 1, 12, and 13, configurations of a USB power delivery controller 1000 and a BMC processing circuit 1100 according to a first embodiment of the present invention will be described.

Figure 13:
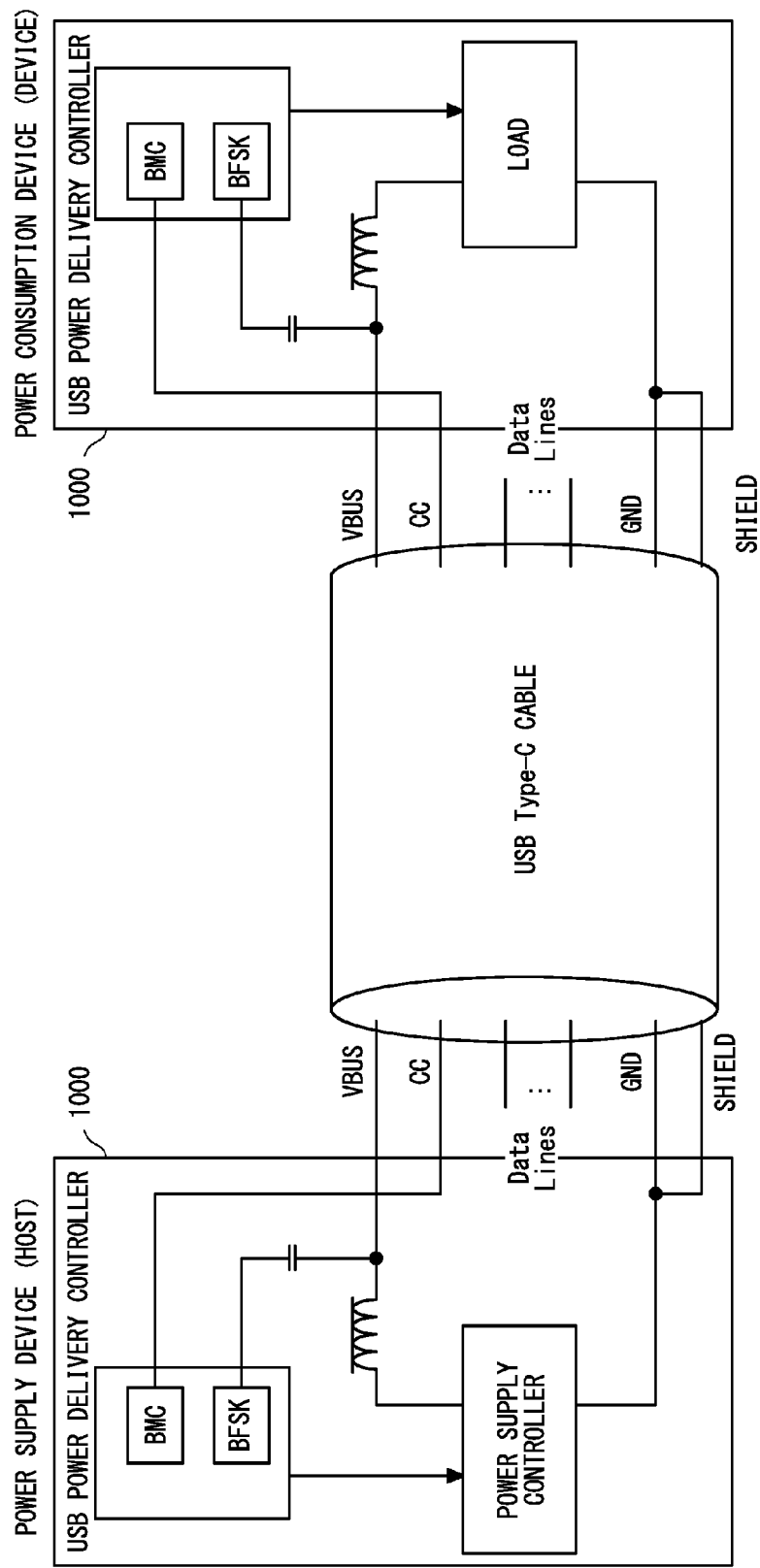
FIG. 13 is a diagram showing a configuration of a system including the USB power delivery controller 1000 according to the first embodiment of the present invention.

FIG. 13 is an overall view of a system including a USB power delivery controller 1000. The USB power delivery controller 1000 is a controller included in each of a power supply device (Source) and a power consumption device (Sink) and has a function of controlling power supply or power reception in compliance with the USB Power Delivery standard.

The USB power delivery controllers 1000 included in the power supply device and the power consumption device communicate with each other via a communication line CC or a power line VBUS included in, for example, a USB Type-C cable and carry out negotiations for power control. According to the result of the negotiations, a power supply controller of the power supply device supplies power to a load of the power consumption device via the power line VBUS.

Figure 12:
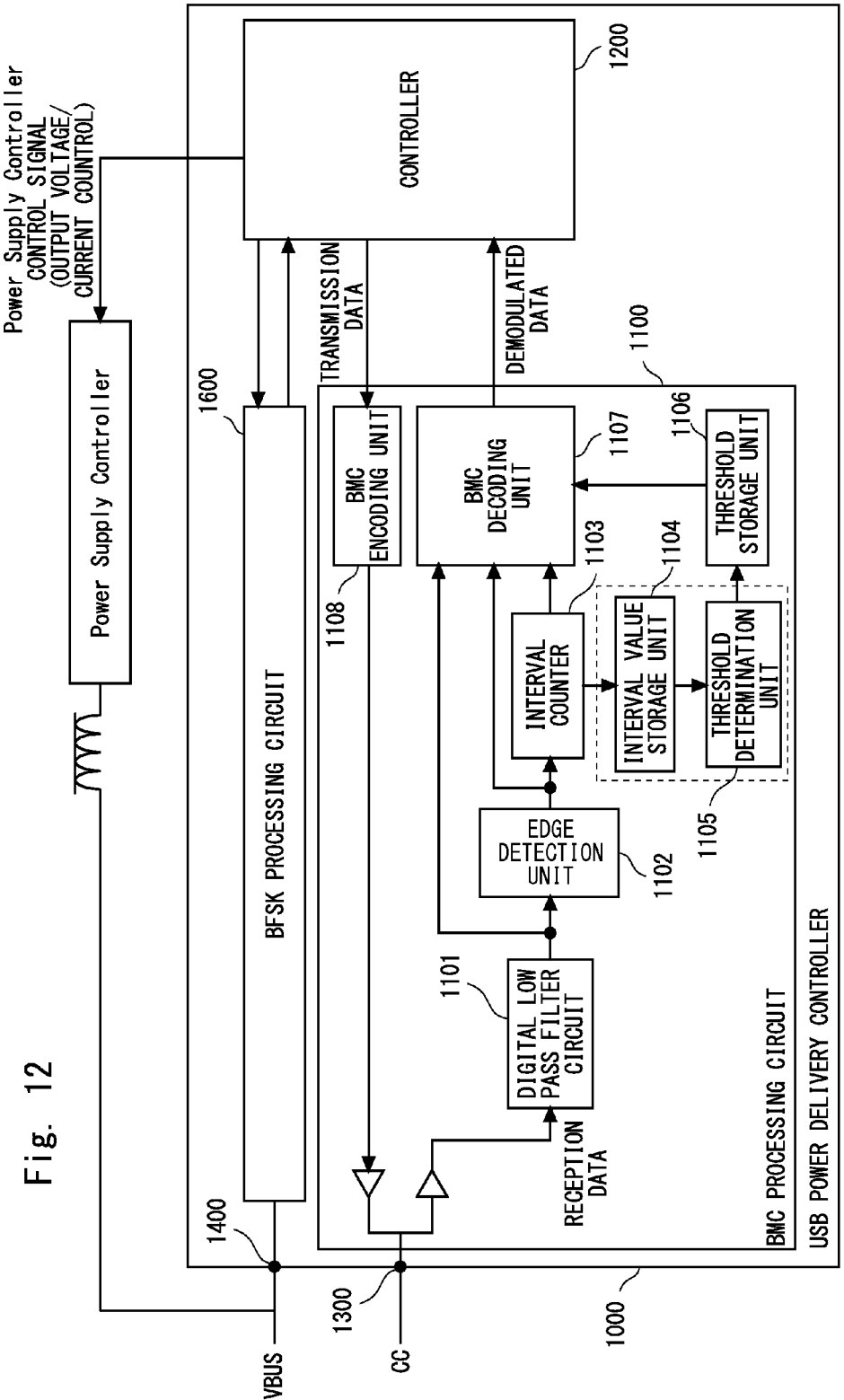
FIG. 12 is a diagram showing a configuration of a USB power delivery controller 1000 according to the first embodiment of the present invention.

FIG. 12 is a diagram showing a configuration of the USB power delivery controller 1000.

The USB power delivery controller 1000 includes a BMC processing circuit 1100, a controller 1200, a CC connecting unit 1300, a VBUS connecting unit 1400, and a BFSK processing circuit 1600.

The CC connecting unit 1300 is connected to, for example, the communication line CC of the USB Type-C cable.

The BMC processing circuit 1100 is a circuit that performs negotiations for power control by the BMC method. The BMC processing circuit 1100 is connected to the CC connecting unit 1300 and communicates with the BMC processing circuit 1100 on the opposite side via the communication line CC.

The VBUS connecting unit 1400 is connected to, for example, the power line VBUS of the USB Type-C cable.

The BFSK processing circuit 1600 is a known circuit that executes negotiations for power control by the BFSK method. The BFSK processing circuit 1600 is connected to the VBUS connecting unit 1400 and communicates with the BFSK processing circuit 1600 on the opposite side via the power line VBUS.

The controller 1200 is connected to the BMC processing circuit 1100 and the BFSK processing circuit 1600, and receives a request to supply or receive power according to the result of the above negotiations. Further, the controller 1200 is connected to the power supply controller or the load, and outputs the instruction to supply or receive power according to the above request.

Figure 1:
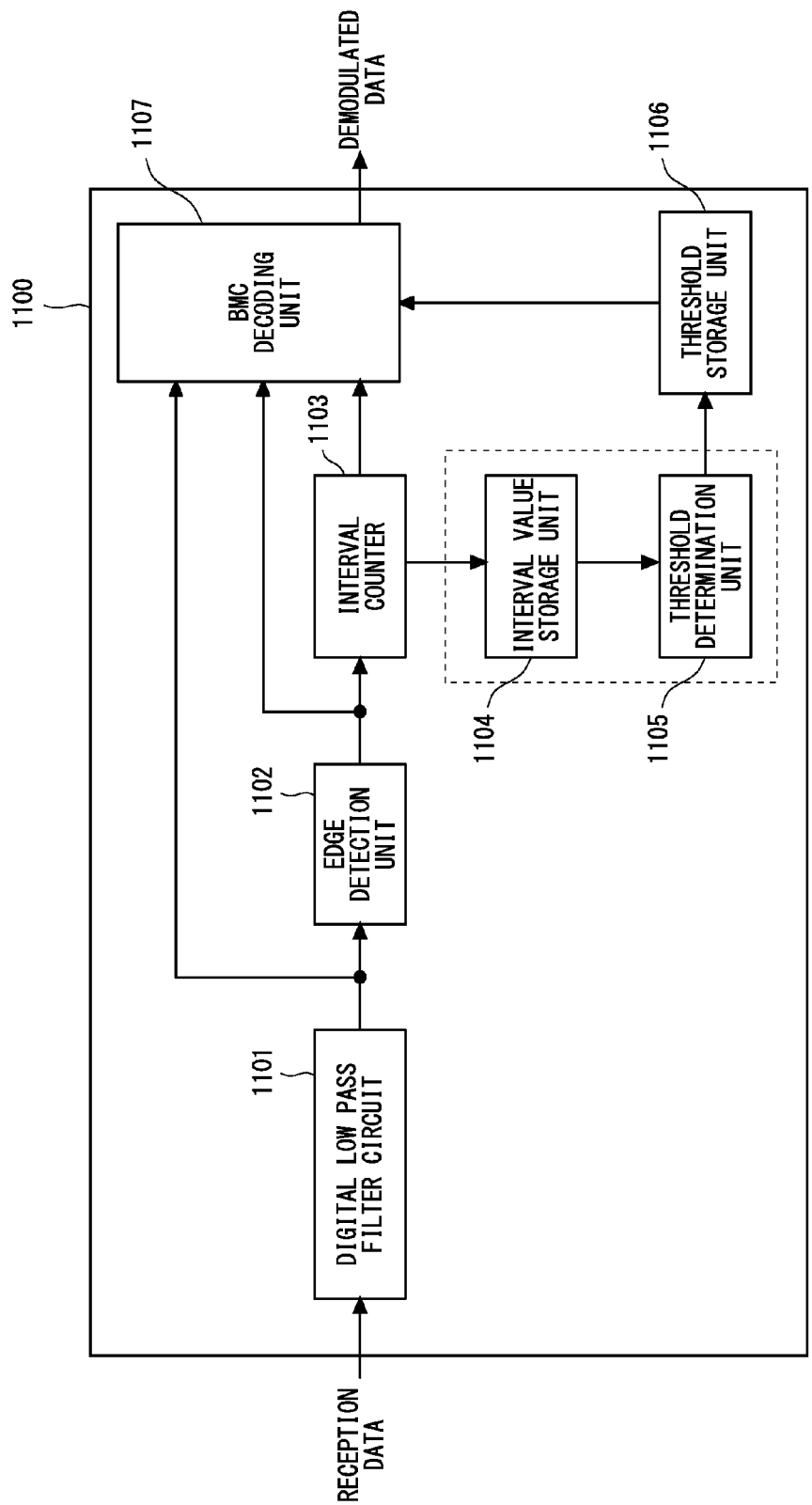
FIG. 1 is a diagram showing a configuration of a BMC processing circuit 1100 according to a first embodiment of the present invention.

FIG. 1 is a diagram showing a configuration of the BMC processing circuit 1100. Note that in FIG. 1, only the components related to a reception of the BMC are shown among the components of the BMC processing circuit 1100 shown in FIG. 12, and a BMC encoding unit used for only a transmission of the BMC is omitted.

The BMC processing circuit 1100 includes a digital low pass filter circuit 1101, an edge detection unit 1102, an interval counter 1103, an interval value storage unit 1104, a threshold determination unit 1105, a threshold storage unit 1106, and a BMC decoding unit 1107.

The digital low pass filter circuit 1101 performs processing for removing noise components from a reception signal input via the communication line CC.

The edge detection unit 1102 performs processing for detecting edges where the state of the reception signal changes.

The interval counter 1103 measures a Low period in the reception signal (duration time of a state in which the reception signal is recognized to be Low) and a High period in the reception signal (duration time of a state in which the reception signal is recognized to be High), and stores measurement values (interval values) in the interval value storage unit 1104.

The interval value storage unit 1104 is a register that stores the interval values measured by the interval counter 1103.

The threshold determination unit 1105 determines a threshold, which is a parameter to distinguish bits in the reception signal, using the interval values stored in the interval value storage unit 1104.

The threshold storage unit 1106 is a register that stores the threshold determined by the threshold determination unit 1105.

The BMC decoding unit 1107 performs decoding of the reception data using the threshold stored in the threshold storage unit 1106.

Figure 3:
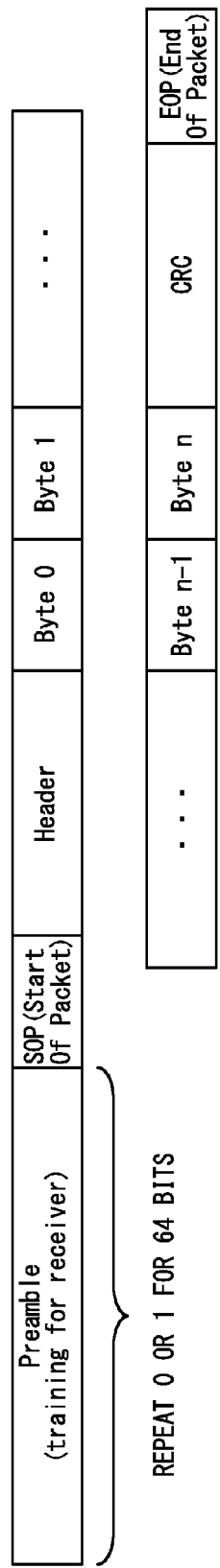
FIG. 3 is a diagram showing one example of a reception packet according to the first embodiment of the present invention.

Referring next to FIG. 3, a packet format according to the USB Power Delivery standard received by the BMC processing circuit 1100 according to the first embodiment of the present invention will be described.

Each of the packets conforming to the above standard has a preamble in its head part. In this preamble, 0 and 1 are repeated for 64 bits, starting from 0 and ending with 1.

Figure 4:
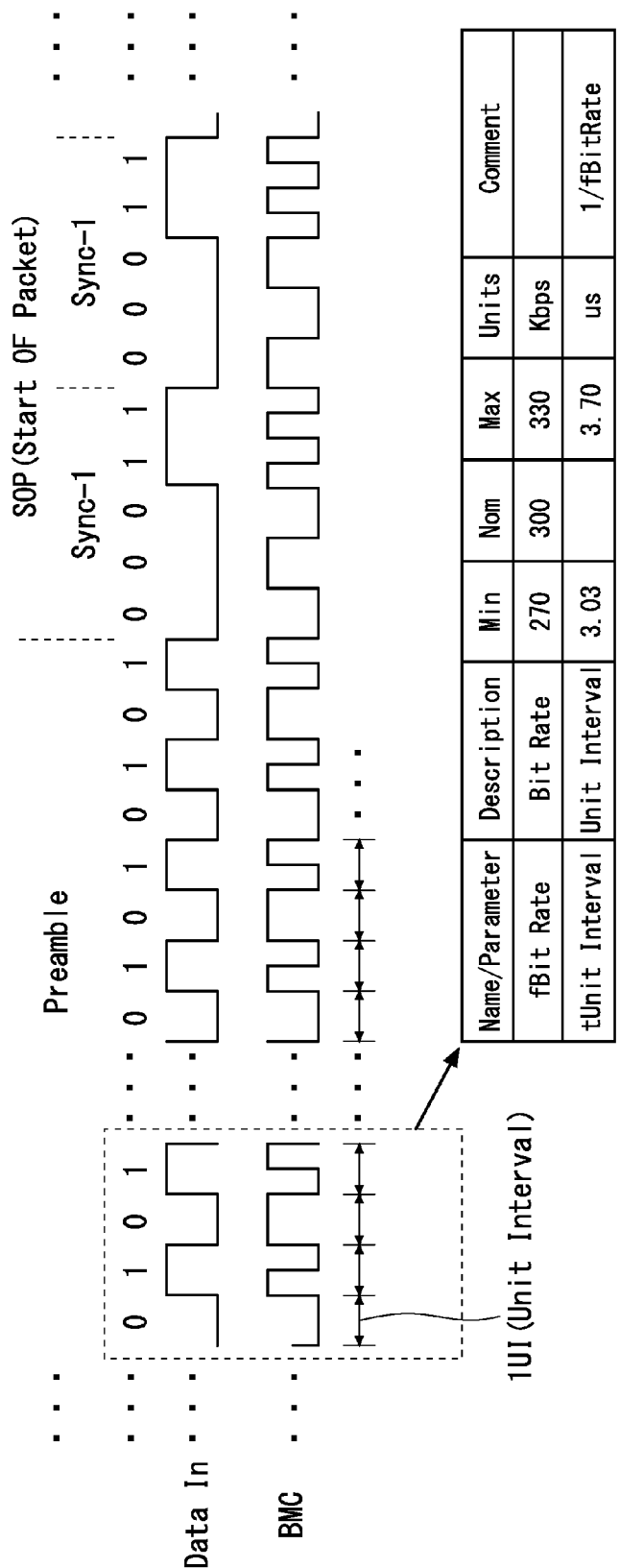
FIG. 4 is a diagram showing one example of the reception packet according to the first embodiment of the present invention.

FIG. 4 shows one example of the packet coded by the BMC method according to the above standard. The BMC code includes one-bit signal expressed by a signal state in a period of Unit Interval (tUnitInterval). When the data is 0, the signal is coded in such a way that the signal state inverted at the bit boundary is kept for the period of Unit Interval. When the data is 1, the signal is coded in such a way that the signal state inverted at the bit boundary has been changed again prior to a threshold period and then goes back to the original signal state when the period of Unit Interval has elapsed. As stated above, the BMC coded signal has a characteristic that the signal state is definitely inverted at the bit boundary. In other words, the BMC code includes "long" signal in which the Low or High period is kept for the period of Unit Interval, and a "short" signal in which the Low or High period is kept for substantially half the period of Unit Interval. One "long" signal is interpreted as the bit "0" and two successive "short" signals are interpreted as the bit "1".

Figure 2:
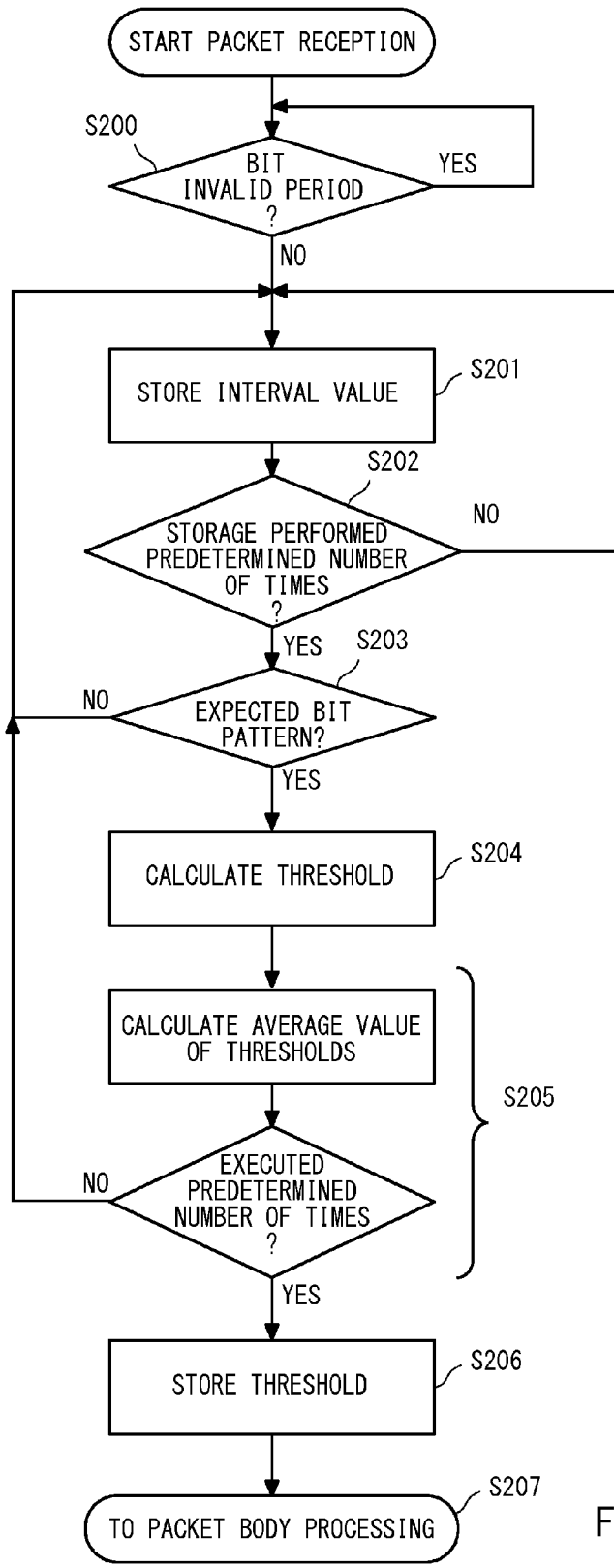
FIG. 2 is a diagram showing an operation of the BMC processing circuit 1100 according to the first embodiment of the present invention.

Next, with reference to a flowchart in FIG. 2, an operation of the BMC processing circuit 1100 according to the first embodiment of the present invention will be described.

S200: Determine Bit Invalid Period or Packet Reception Start

As stated above, the signal state of the BMC coded signal is definitely inverted at the bit boundary. The edge detection unit 1102 detects the presence or the absence of change edges of the signal state from the reception signal using this characteristic to determine the bit invalid period or the packet reception start. Specifically, when the change edges have been detected, the edge detection unit 1102 determines that the reception of the packet has been started. On the other hand, when the change edges have not been detected, the edge detection unit 1102 determines that this period corresponds to a bit invalid period, which means the period in which no packet has been received.

It is possible that the edge detection unit 1102 cannot properly detect edges because the reception signal includes noise originating from transmission paths, for example. Therefore, it is preferable that the digital low pass filter circuit 1101 first remove noise components from the reception signal before the edge detection unit 1102 detects edges.

S201: Measure and Store Interval Value

When the edge detection unit 1102 performs determination of the packet reception start, the interval counter 1103 immediately starts counting time until the next change edge in the signal state is detected. When the edge detection unit 1102 detects the next change edge in the signal state, the interval counter 1103 stores the counter value, which is the time that has been measured, in the interval value storage unit 1104. At the same time, the interval counter 1103 re-starts counting the time until the next change edge in the signal state is detected.

S202: Store Interval Values for Predetermined Number of Times

In this embodiment, it is assumed that the interval value storage unit 103 is able to store the interval measurement values for successive six periods. The interval counter 1103 measures the interval values for the successive six periods corresponding to the head part of the preamble from the start of the packet reception, and stores the measurement values.

S203: Determine Expected Bit Pattern

The threshold determination unit 1105 checks whether the reception signal corresponds to the preamble part of the packet in compliance with the USB Power Delivery standard. The threshold determination unit 1105 first acquires an initial value of the threshold stored in the threshold storage unit 1106 in advance. Next, the threshold determination unit 1105 determines whether each of the six interval values stored in the interval value storage unit 1104 corresponds to "long" or "short" using the initial value of the threshold that has been acquired.

The threshold is a reference value to classify the lengths of the interval values detected from the reception signal into one of "long" and "short". That is, when the interval value is smaller than the threshold, the length of the interval value is determined to be "short". When the interval value is equal to or larger than the threshold, the length of the interval value is determined to be "long".

Note that the initial value of the threshold is not necessarily stored in the threshold storage unit 1106 and it may be input to the threshold determination unit 1105 from, for example, an input interface (not shown) or may be recorded in a ROM (not shown).

Further, it is preferable to calculate in advance and set as the initial value of the threshold, an interval value considering the influence of the GND bounce of the transmission apparatus and the reception apparatus and the reception characteristics of the reception apparatus for the worst case in the MIN-MAX bit rate of tUnitInterval defined by the above standard.

After all the six successive interval values have been determined to be "long" or "short", the threshold determination unit 1105 determines whether the pattern of the determination results corresponds to one of the following three types of combinations.

Figure 5:
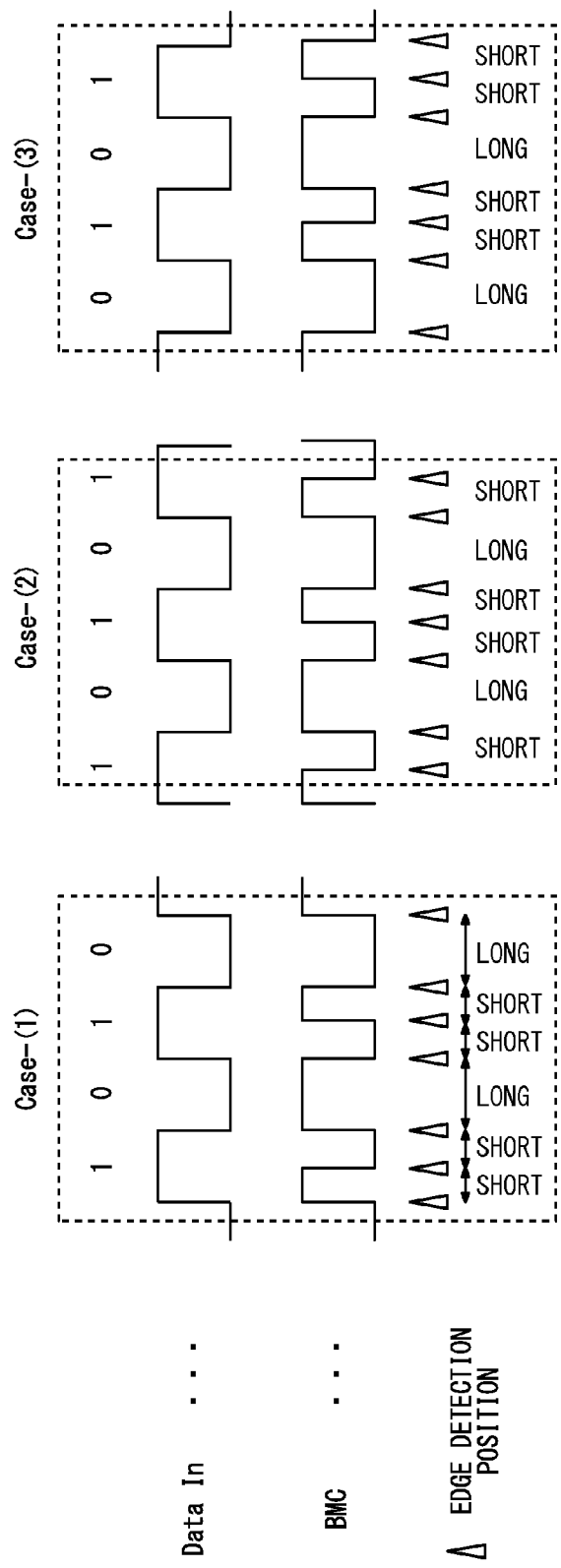
FIG. 5 is a diagram for describing validity determination processing according to the first embodiment of the present invention.

(1) short, short, long, short, short, long (2) short, long, short, short, long, short (3) long, short, short, long, short, short If the pattern of the determination results corresponds to one of the three types of combinations, it is estimated that this bit string is the preamble of the packet in compliance with the USB Power Delivery standard. As stated above, the pattern of "0101 . . . " continues for 64 bits in the preamble in compliance with this standard. Therefore, when this preamble is detected, as shown in FIG. 5, the preamble is one of the above three types of patterns. Thus, the threshold determination unit 1105 determines that this reception packet is valid and moves to the processing for correcting the threshold in S204.

On the other hand, when the reception packet has not been determined to be valid, that is, when the "long" "short" pattern of the reception signal does not correspond to any one of the above three types of combinations, the threshold determination unit 1105 determines that the preamble of the reception signal has not been correctly recognized and skips the processing for correcting the threshold in S204.

S204: Correct Threshold

When the reception packet has been determined to be valid, the threshold determination unit 1105 performs processing for correcting the initial value of the threshold and determining a new threshold suitable for decoding of the reception signal that has actually been received.

The new threshold can be calculated, for example, by the following calculation formula.

New threshold=longest value of "short" interval value+((a)+(b))/2

(a) Minimum value of |"long" interval value-threshold|
(b) Minimum value of |"short" interval value-threshold|

S205: Repeat Predetermined Number of Times

The interval counter 1103 and the threshold determination unit 1105 repeatedly execute the processing of S201 to S205 a plurality of times to obtain a plurality of new thresholds. The threshold determination unit 1105 then determines the average value of the plurality of new thresholds as the threshold to be used to decode the data included in the reception signal. The number of times of repeat may be any number as long as these processing are executed for the preamble.

S206: Store New Threshold

The threshold determination unit 1105 stores the threshold that has been averaged in 5205 in the threshold storage unit 1106.

S207: Packet Body Processing

The BMC decoding unit 1107 executes processing for decoding a data part of the reception packet using the new threshold calculated in S205.

In this embodiment, the interval counter 1103 measures the interval values in the preamble period of the reception packet and the threshold determination unit 1105 corrects the threshold that has been set in advance to calculate a new threshold. It is therefore possible to distinguish bits with high accuracy using the threshold suitable for the actual reception packet, whereby it is possible to achieve stable reception and decoding.

Further, in this embodiment, the length of the interval is recognized from the actual reception signal, whereby it is possible to determine the bit according to the actual reception signal.

Regarding this point, in the prior art, instead of setting the threshold based on the actual reception signal as described in this embodiment, decoding processing is performed using only the threshold fixedly set in advance. At this time, the threshold needs to be set with a sufficient margin in consideration of characteristic variations of a bit rate or a receiver. It is therefore required to increase the sampling clock rate of the reception signal.

In contrast, in this embodiment, it is sufficient that the length of the interval can be recognized from the actual reception signal. Therefore, the sampling clock rate may be lower than that in the prior art. It is therefore possible to keep the stable reception state according to the actual reception signal without increasing the power consumption.

<Second Embodiment>

Figure 6:
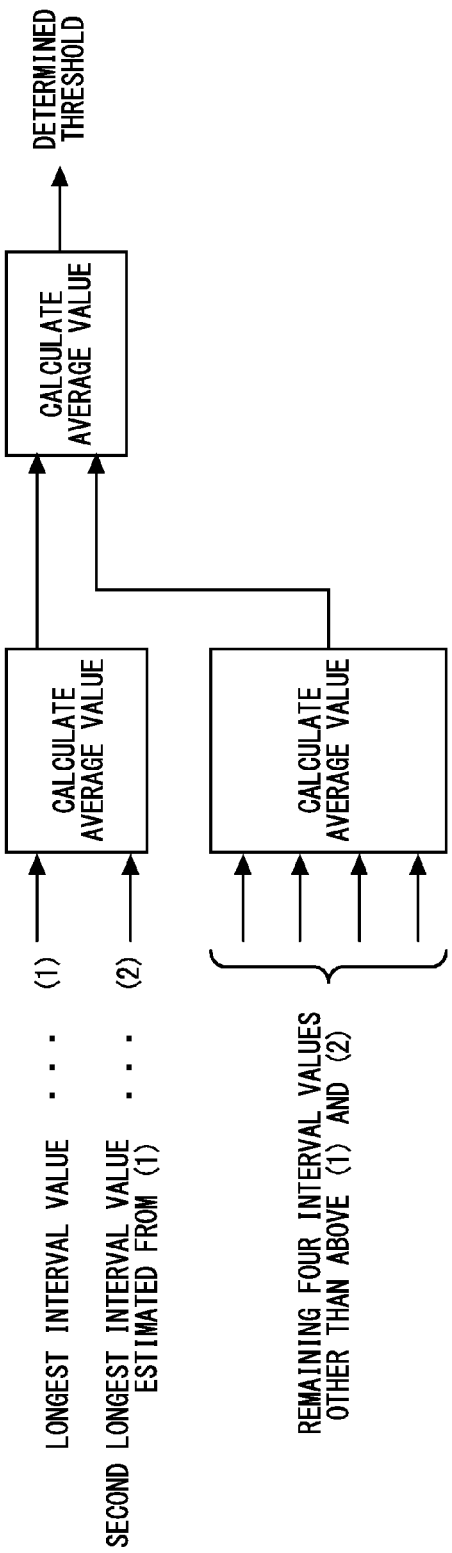
FIG. 6 is a diagram showing the outline of a second embodiment of the present invention.

A second embodiment of the present invention is characterized by the method of determining the threshold by the threshold determination unit 1105. As shown in FIG. 6, the second embodiment is characterized in that the threshold determination unit 1105 determines the threshold by calculating the average value of two long interval values, the average value of the remaining four short interval values, and the average value of these two average values.

Note that since the configurations of the digital low pass filter circuit 1101 and the BMC processing circuit 1100 according to the second embodiment are similar to those of the first embodiment, the descriptions thereof will be omitted.

Figure 7:
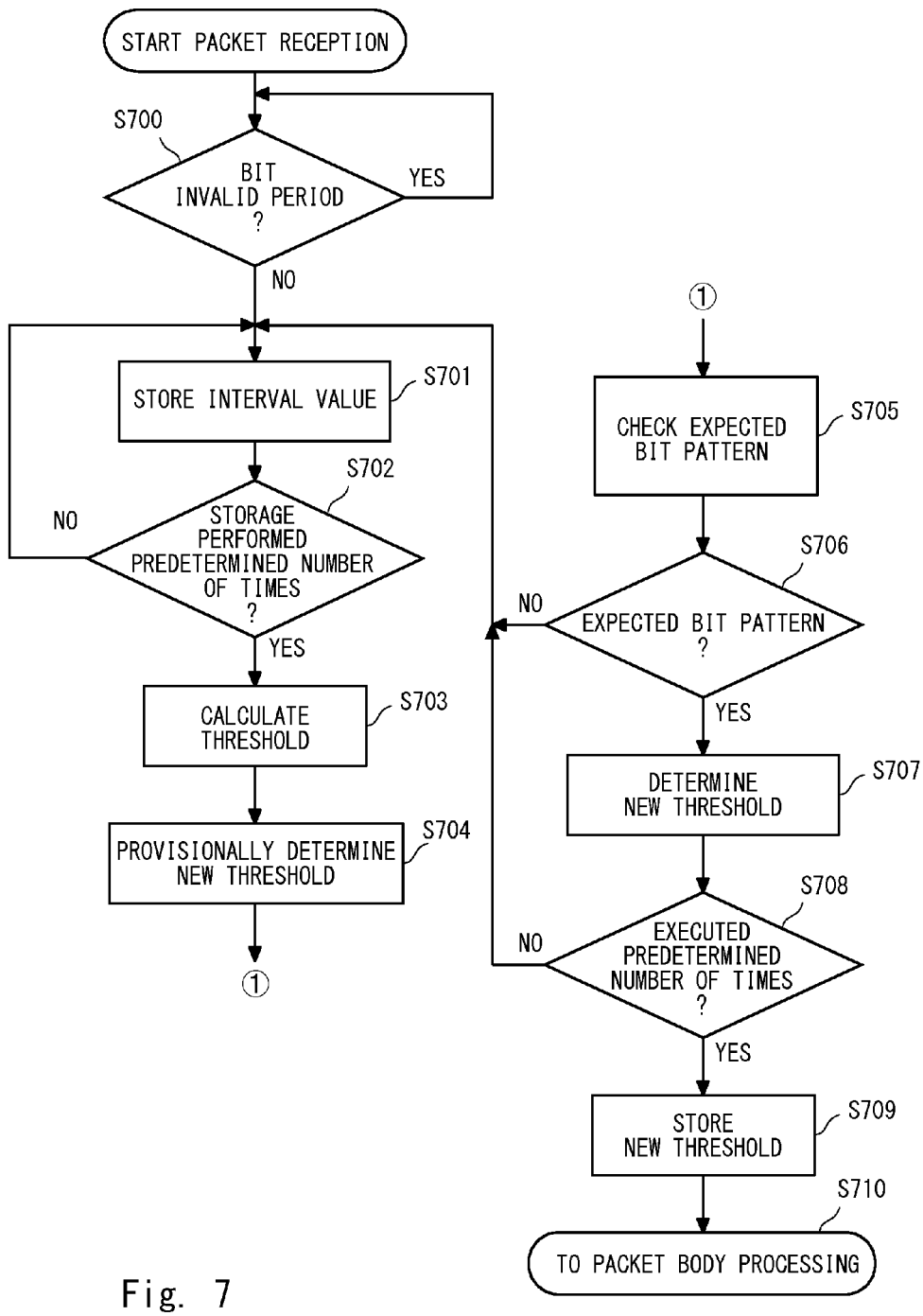
FIG. 7 is a diagram showing an operation of the second embodiment of the present invention.

Next, with reference to FIG. 7, an operation of the BMC processing circuit 1100 according to the second embodiment of the present invention will be described.

S700: Determine Bit Invalid Period or Packet Reception Start

Similar to S200 according to the first embodiment, the edge detection unit 1102 detects the presence or the absence of the change edges of the signal state from the reception signal to determine the bit invalid period or the packet reception start.

S701 to S702: Measure Interval Value and Store Interval Values Predetermined Number of Times Similar to S201, the interval counter 1103 measures the interval value and stores the interval value in the interval value storage unit 1104. This measurement and storage are performed for six periods from the point at which the packet reception is started. The six periods typically correspond to the head part of the preamble and correspond to a part in which "0" and "1" are each encoded twice.

The interval counter 1103 and the interval value storage unit 1104 according to this embodiment include a mechanism to specify the longest interval value in the six periods. For example, the interval value storage unit 1104 stores the interval values that have been measured in registers to which Index numbers 1 to 6 are attached in order. Further, it is assumed that the interval value storage unit 1104 holds the Index number that stores the longest interval value at this time as a longest Index number.

When the interval values that have been measured are stored in the interval value storage unit 1104, the interval counter 1103 compares the interval value to be newly stored with the interval value of the longest Index number. If the interval value that has been newly stored is larger than the interval value of the longest Index number, the interval counter 1103 updates the longest Index number with the Index number of the interval value that has been newly stored. The interval counter 1103 repeats this processing until the interval values for six periods are stored, whereby it is possible to specify the longest interval value in the six periods.

Note that while the example in which processing for updating the longest Index number is performed when a new interval value is stored has been described here, this embodiment is not limited to this example. For example, the processing for updating the longest Index number may be performed by searching all the interval values that have been stored as pre-processing performed before the calculation of the threshold after all the interval values are stored.

S703: Threshold Calculation

Figure 8:
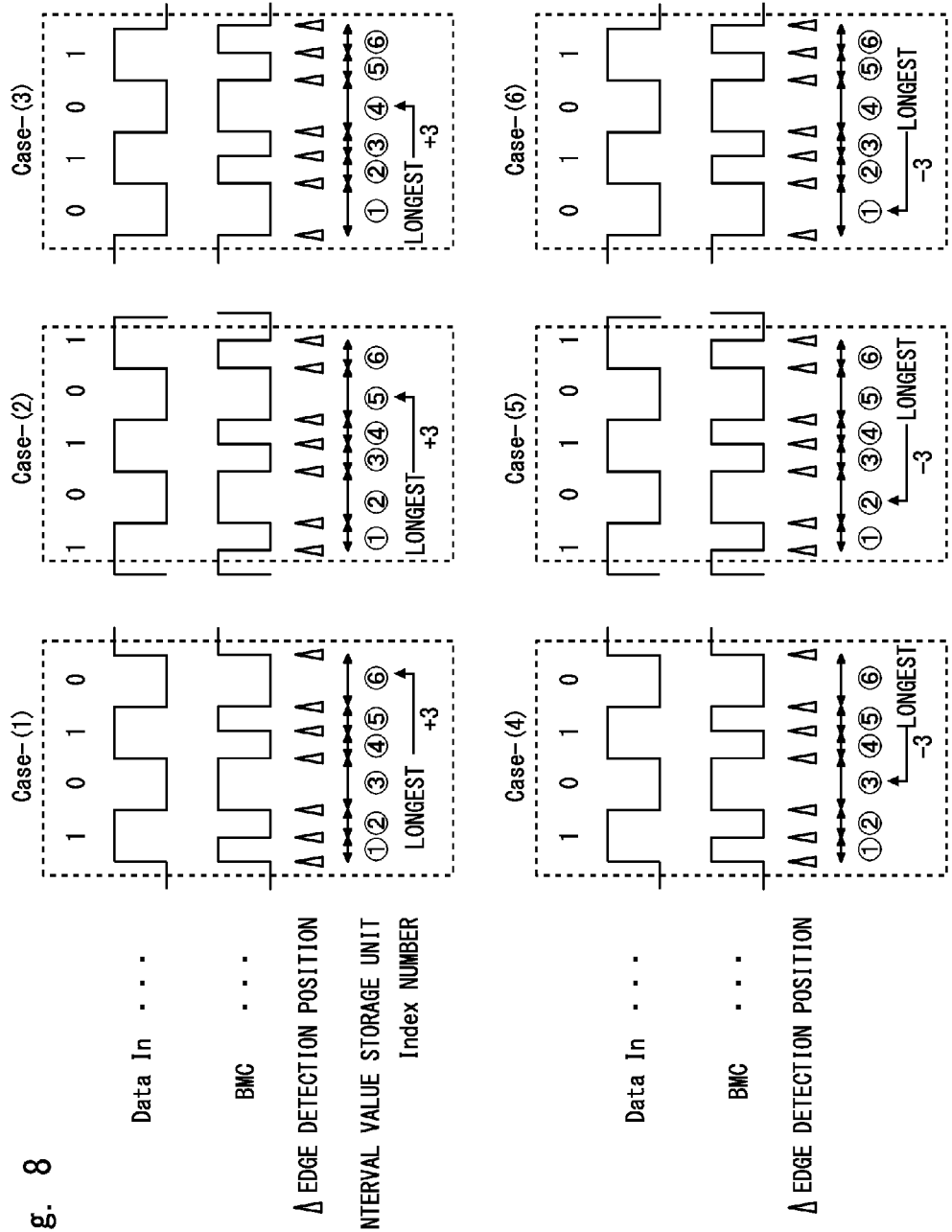
FIG. 8 is a diagram for describing validity determination processing according to the second embodiment of the present invention.

The threshold determination unit 1105 calculates the threshold using the interval values for six periods stored in the interval value storage unit 1104. In this embodiment, first, processing for classifying the interval values into one of "long" and "short" is performed assuming that the pattern of the interval values conforms to the correct expected bit pattern as shown in FIG. 8, which is the bit pattern of the preamble part defined by the USB Power Delivery standard.

First, the interval value corresponding to "long" is estimated. The threshold determination unit 1105 determines the interval value stored in the longest Index number held by the interval value storage unit 1104 to be "long". Further, when the longest Index number is included in the first to third periods, the interval value stored in the longest Index number +3 is estimated to be "long". Similarly, when the longest Index number is included in the fourth to six periods, the interval value stored in the longest Index number −3 is also estimated to be "long". Next, the interval values stored in the remaining four Index numbers are estimated to be "short".

Then, using the two "long" interval values and four "short" interval values, the threshold is calculated by the following calculation formula.

$$\text{Threshold} = ((a)+(b))/2$$

(a) Average value of two "long" interval values
(b) Average value of four "short" interval values In the above example, the longest Index number is first determined and then it is estimated whether each of the interval values of the other Index numbers is "long" or "short" based on the positional relation between the longest Index number and the other Index numbers. However, this embodiment is not limited to this example. It is also possible to first determine the shortest Index number and then estimate whether each of the interval values of the other Index numbers is "long" or "short" based on the positional relation between the shortest Index number and the other Index numbers.

S704: Provisionally Determine New Threshold

The threshold determination unit 1105 provisionally determines the threshold that has been calculated as a new threshold when the threshold calculation processing shown in S703 is carried out for the first time. On the other hand, when the threshold calculation processing shown in S703 has been carried out before and the threshold has already been calculated before, the threshold determination unit 1105 calculates the average value of the thresholds that have been previously calculated and provisionally determines the average value as a new threshold.

S705 to S706: Check Expected Bit Pattern

The threshold determination unit 1105 determines whether each of the six interval values stored in the interval value storage unit 1104 is long or short again using the threshold that has been provisionally determined in S704. By confirming that the two interval values that have been determined to be "long" in S703 are longer than both the provisional threshold and the remaining four interval values that have been determined to be "short" in S703 are all shorter than the provisional threshold, it can be verified that these interval values definitely match the expected bit pattern of the preamble part defined by the USB Power Delivery standard and valid. Further, it can be verified that the new threshold that has been provisionally determined in S704 is valid.

S707: Determine New Threshold

When it is determined as a result of the check in S705 that the interval value is valid, the threshold provisionally determined in S704 is determined as a new threshold to be used in the following processing. On the other hand, when it is determined in S704 that the interval value is invalid, the threshold calculated in the immediately previous S703 and the threshold that has been provisionally determined in S704 are discarded.

S708: Repeat Predetermined Number of Times

The processing of S701 to S707 is repeated a plurality of times within the period in which the preamble is received.

S709: Store New Threshold

The threshold determination unit 1105 stores the new threshold that has been last determined to be valid in S707 in the threshold storage unit 1106.

S710: Packet Body Processing

The BMC decoding unit 1107 executes processing for decoding the data part of the reception packet using the new threshold that has been determined in S709.

In this embodiment, the interval counter 1103 first analyzes the reception signal to calculate the threshold, and the threshold determination unit 1105 verifies and corrects the threshold to determine the threshold. Therefore, there is no need to prepare the initial value of the threshold in advance unlike the first embodiment. Further, the classification processing based on the interval values that have been measured can be executed by a simple circuit and a simple procedure, whereby the threshold can be calculated for a low cost and for a low load.

<Third Embodiment>

Figure 9:
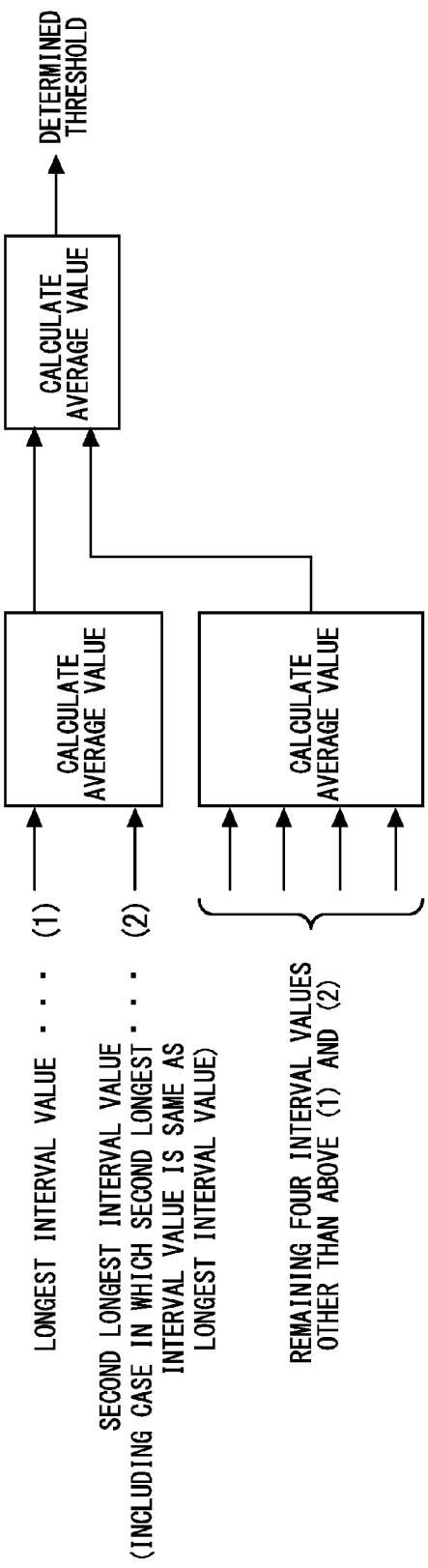
FIG. 9 is a diagram showing the outline of a third embodiment of the present invention.

A third embodiment of the present invention is characterized by the method of determining the threshold by the threshold determination unit 1105. As shown in FIG. 9, in the third embodiment as well, similar to the second embodiment, the threshold determination unit 1105 calculates the average value of two long interval values, the average value of the remaining four short interval values, and the average value of these two average values. However, the third embodiment is characterized in that the accuracy for the determination is improved by adding a process of checking whether each interval value is long or short.

Note that since the configurations of the digital low pass filter circuit 1101 and the BMC processing circuit 1100 according to the third embodiment are similar to those of the first and second embodiments, the descriptions thereof will be omitted.

Figure 10:
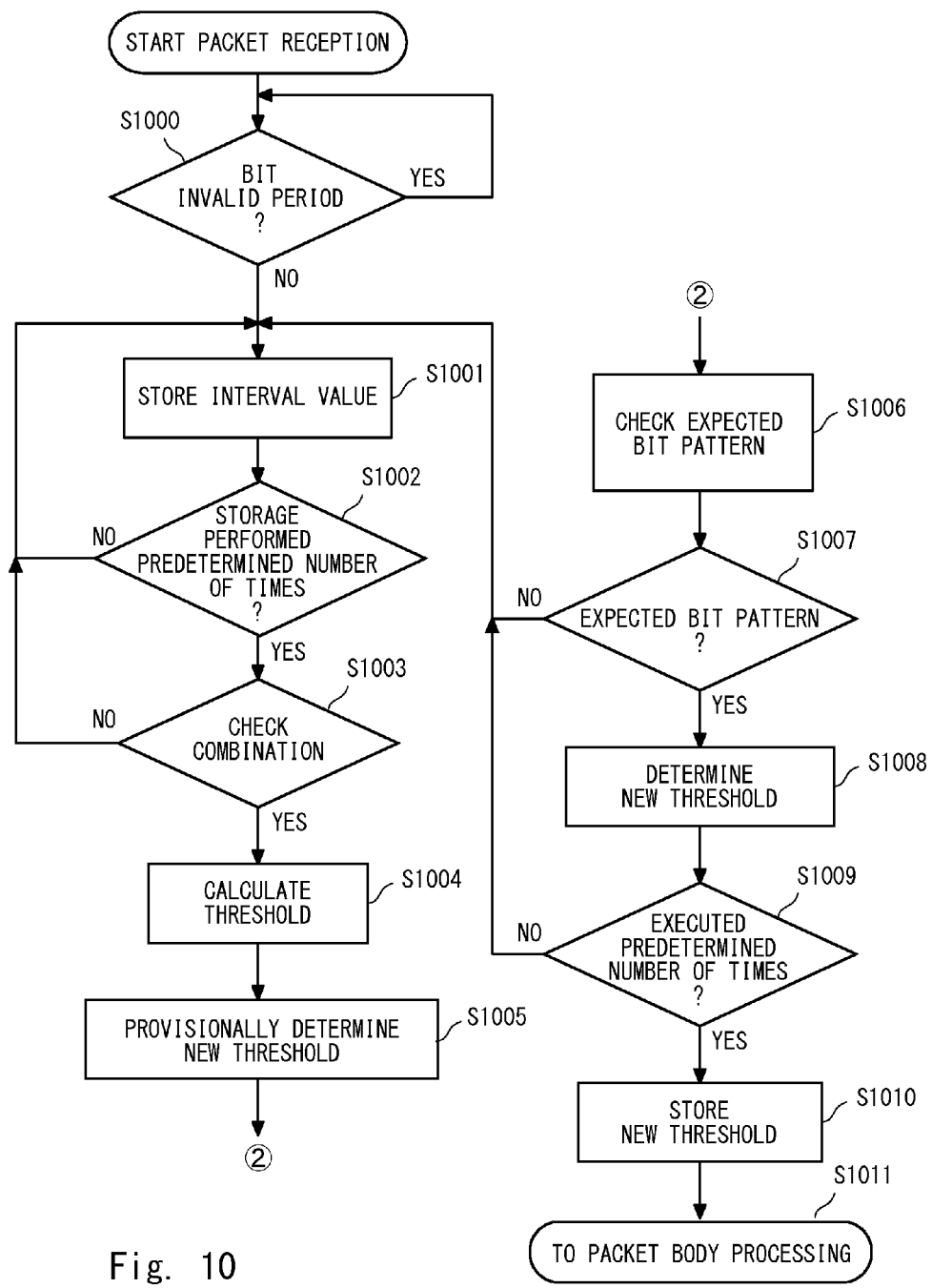
FIG. 10 is a diagram showing an operation of the third embodiment of the present invention.

Referring next to FIG. 10, an operation of the BMC processing circuit 1100 according to the third embodiment of the present invention will be described.

S1000: Determine Bit Invalid Period or Packet Reception Start

Similar to S200 in the first embodiment, the edge detection unit 1102 detects the presence or the absence of the change edges of the signal state from the reception signal to determine the bit invalid period or the packet reception start.

S1001 and S1002: Measure Interval Value and Store Interval Values Predetermined Number of Times Similar to S201, the interval counter 1103 measures the interval value and stores the interval value in the interval value storage unit 1104. This measurement and the storage are executed for six periods from the point at which the packet reception is started.

The interval counter 1103 and the interval value storage unit 1104 according to this embodiment include a mechanism to specify the longest interval value and the second longest interval value in the six periods. The interval value storage unit 1104 stores, for example, the interval values that have been measured in registers to which Index numbers 1 to 6 are attached in order. Note that the interval value storage unit 1104 holds the longest Index number which stores the longest interval value at this time and the second longest Index number.

When the interval values that have been measured are stored in the interval value storage unit 1104, the interval counter 1103 compares the interval value that is to be newly stored with the interval value of the longest Index number. If the interval value that has been newly stored is larger than the interval value of the longest Index number, the interval counter 1103 updates the longest Index number with the Index number of the interval value that has been newly stored. The interval counter 1103 then stores the former-longest Index number as the second longest Index number. The interval counter 1103 repeats this processing until the interval values for six periods are stored, whereby it is possible to specify the longest interval value and the second longest interval value in the six periods.

Note that while the example in which processing for updating the longest Index number is performed when a new interval value is stored has been described here, this embodiment is not limited to this example. For example, the processing for updating the longest Index number may be performed by searching all the interval values that have been stored as the pre-processing performed before the calculation of the threshold after all the interval values are stored.

S1003: Check Combinations

In this embodiment as well, first, processing for classifying the interval values into one of "long" and "short" is performed assuming that the pattern of the interval values conforms to the expected bit pattern of the preamble part.

Figure 11:
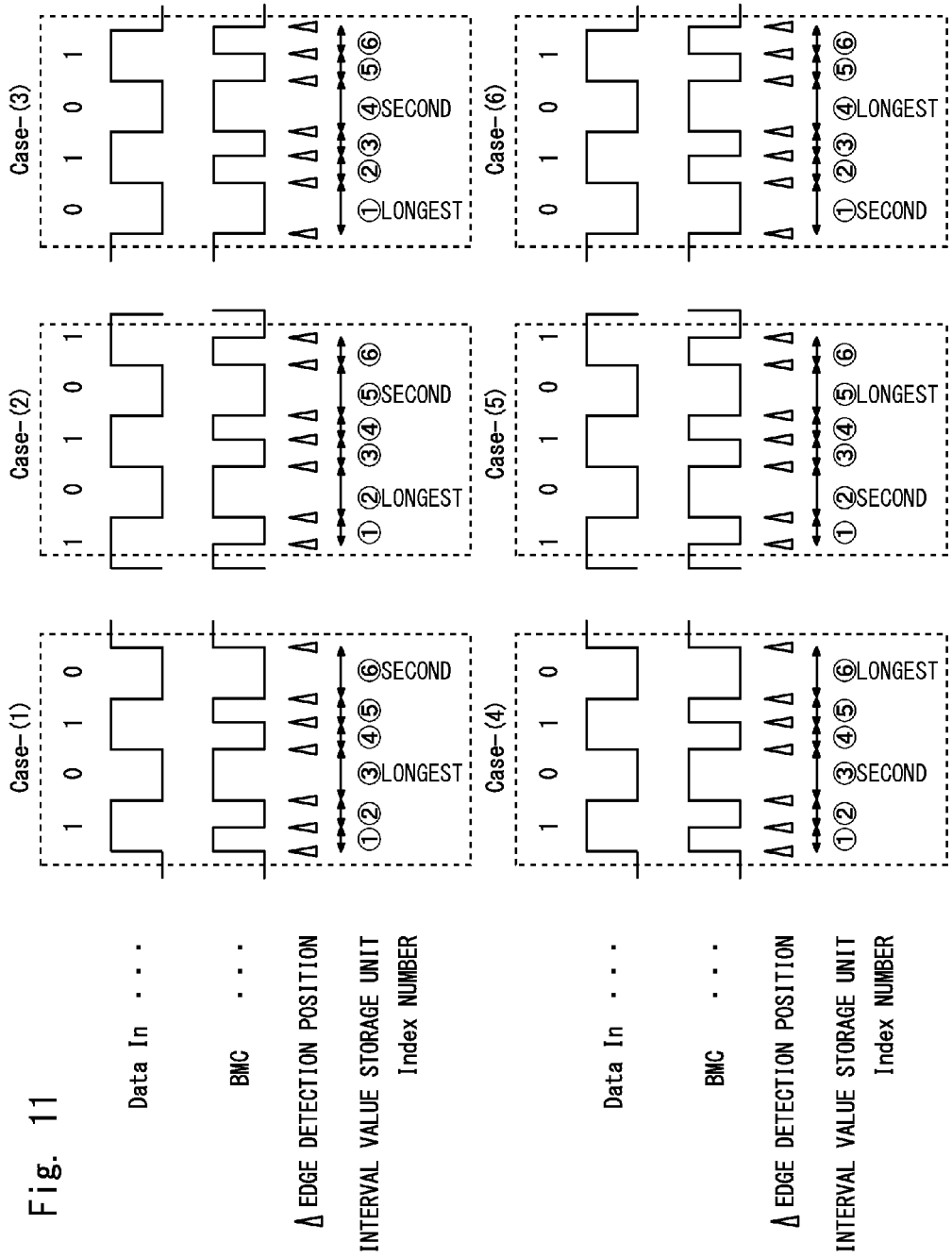
FIG. 11 is a diagram for describing validity determination processing according to the third embodiment of the present invention.

First, the threshold determination unit 1105 determines the interval value stored in the longest Index number held by the interval value storage unit 1104 and the interval value stored in the second longest Index number to be "long". The threshold determination unit 1105 then determines whether the positional relation between the two "long" interval values and the other four interval values matches any one of the six patterns shown in FIG. 11. FIG. 11 shows bit patterns that are expected when the preamble part is received.

S1004: Threshold Calculation

When it is determined that the positional relation matches one of the six patterns, the threshold determination unit 1105 regards that these interval values are valid or correspond to the preamble, and calculates the threshold by the following calculation formula.

$$\text{Threshold} = ((a)+(b))/2$$

(a) Average value of two "long" interval values
(b) Average value of remaining four interval values S1005: Provisionally Determine New Threshold The threshold determination unit 1105 provisionally determines the threshold that has been calculated as a new threshold when the threshold calculation processing shown in S1004 is carried out for the first time. On the other hand, when the threshold calculation processing shown in S1004 has been carried out before and the threshold has already been calculated before, the threshold determination unit 1105 calculates the average value of the thresholds that have been previously calculated and provisionally determines the average value as a new threshold.

S1006 and S1007: Check Expected Bit Pattern

The threshold determination unit 1105 determines whether each of the six interval values stored in the interval value storage unit 1104 is long or short again using the threshold that has been provisionally determined in S1005.

By confirming that both the two interval values that have been determined to be "long" in S1003 are longer than the provisional threshold and all the remaining four interval values are shorter than the provisional threshold, it can be verified that these interval values definitely match the expected bit pattern of the preamble part defined by the USB Power Delivery standard and valid. Further, it can be verified that the new threshold that has been provisionally determined in S1005 is valid.

S1008: Determine New Threshold

When it is determined as a result of the check in S1006 that the interval value is valid, the threshold that has been provisionally determined in S1005 is determined as a new threshold to be used in the following processing. Meanwhile, when it is determined in S1005 that the interval value is invalid, the threshold calculated in the immediately previous S1004 and the threshold that has been provisionally determined in S1005 are discarded.

S1009: Repeat Predetermined Number of Times

The processing of S1001 to S1008 is repeated a plurality of times within the period in which the preamble is received.

S1010: Store New Threshold

The threshold determination unit 1105 stores a new threshold that has been last determined to be valid in S1008 in the threshold storage unit 1106.

S1011: Packet Body Processing

The BMC decoding unit 1107 executes processing for decoding the data part of the reception packet using the new threshold determined in S1010.

In this embodiment, the threshold determination unit 1105 measures not only the longest interval value but also the second longest interval value and checks the validity of the reception signal based on the positional relation between these interval values. It is therefore possible to improve the accuracy for determining the validity compared to the second embodiment. That is, while the lengths of the other interval values are estimated based on only the longest interval value in the second embodiment, the process for measuring the second longest interval value is added in this embodiment, whereby it is possible to suppress the error in the above estimation process.

<Fourth Embodiment>

A series of processes to determine the threshold described in the first to third embodiments may be executed every time the packet is received or may be executed as needed at desired frequencies or in response to an arbitrary trigger.

For example, a count down timer may be operated for a predetermined period of time after the threshold determination processing has been executed and the threshold determination processing may be executed on the packets that are received after the timer expires. It is therefore possible to deal with waveform rounding during a communication.

Further, the threshold determination processing may be executed upon detecting a connection of the USB cable, and thereafter the threshold determination processing may be regularly performed at desired timings. In the USB Type-C receptacle/plug, for example, the connection of the USB cable can be detected by detecting that one of two CC pins has been connected to the GND via a specific resistor.

The number of communication partners via the CC pin is not limited to one. That is, besides the device to which the USB cable is connected, communication with a device that exists in the cable (Cable Plug) may be conducted to indicate the type or characteristics of the cable. It is therefore preferable to perform threshold determination processing for each communication partner when the threshold determination processing is performed in response to the connection.

<Other Embodiments>

While the invention made by the present inventors has been specifically described above based on the embodiments, it is needless to say that the present invention is not limited to the embodiments already stated above and may be changed in various ways without departing from the spirit of the present invention.

For example, in the first embodiment, the threshold calculated in S703 in the second embodiment may be used in place of the initial value of the threshold.

The above description and drawings are partially omitted and simplified as appropriate for the sake of clarification of the description. Further, each element shown in the drawings as functional blocks that perform various processing can be composed of a CPU, a memory, and other circuits in hardware, and can be implemented by a program or the like loaded to the memory in software. Accordingly, those skilled in the art will be understand that these functional blocks can be achieved in various ways by only the hardware, the software, or the combination thereof without any limitation. Throughout the drawings, the same components are denoted by the same reference symbols and overlapping descriptions will be omitted as appropriate.

The program stated above can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A Biphase Mark Code (BMC) processing circuit comprising:
    an edge detection unit that detects change edges of a reception signal encoded by a BMC method;
    an interval measuring unit that measures interval values for the reception signal, each interval value being a period between two consecutive change edges;
    an interval value storage that stores a predetermined number of successively measured interval values;
    a threshold determination unit that corrects, in response to a determination by the BMC processing circuit that the stored interval values meet a predetermined combination, a first threshold based on the stored interval values to generate a second threshold; and
    a BMC decoding unit that decodes the reception signal based on the second threshold, wherein the threshold determination unit is configured to:
        determine whether each of the stored interval values is longer or shorter than the first threshold; and
        generate the second threshold based on differences between each of the stored interval values and the first threshold, when an arrangement of "long" and "short" interval values of the stored interval values meets the predetermined combination.

2. The BMC processing circuit according to claim 1, wherein the first threshold is an initial value.

3. The BMC processing circuit according to claim 1, wherein the interval measuring unit is configured to generate the first threshold based on the stored interval values.

4. The BMC processing circuit according to claim 1, wherein the threshold determination unit is configured to calculate a plurality of times to generate a plurality of new second thresholds, and wherein the BMC decoding unit is configured to update the second thresholds with a representative value of the plurality of new second thresholds and to decode the reception signal using the updated second threshold.

5. The BMC processing circuit according to claim 1, wherein a preamble part of a packet is used as the reception signal.

6. The BMC processing circuit according to claim 1, further comprising a threshold storage unit that stores at least one of the first threshold and the second threshold,
    wherein the threshold determination unit is configured to update the threshold storage unit with the generated second threshold.

7. A USB Power delivery controller comprising:
    a CC connecting unit that is connected to a communication line of a cable;
    a VBUS connecting unit that is connected to a power line of the cable;
    the BMC processing circuit according to claim 1 that receives the reception signal from the CC connecting unit; and
    a controller that performs power control regarding the power line based on the reception signal decoded by the BMC processing circuit.

8. A Biphase Mark Code (BMC) processing circuit comprising:
    an edge detection unit that detects change edges of a reception signal encoded by a BMC method;
    an interval measuring unit that measures interval values for the reception signal, each interval value being a period between two consecutive change edges;
    an interval value storage that stores a predetermined number of successively measured interval values;
    a threshold determination unit that corrects, in response to a determination by the BMC processing circuit that the stored interval values meet a predetermined combination, a first threshold based on the stored interval values to generate a second threshold; and
    a BMC decoding unit that decodes the reception signal based on the second threshold, wherein the interval measuring unit is configured to:
        determine the longest interval value among the stored interval values;
        estimate the second longest interval value based on an order relation with the longest interval value; and
        generate the first threshold based on a representative value of the longest interval value and the second longest interval value, and a representative value of the remaining interval values.

9. A Biphase Mark Code (BMC) processing circuit comprising:
- an edge detection unit that detects change edges of a reception signal encoded by a BMC method;
- an interval measuring unit that measures interval values for the reception signal, each interval value being a period between two consecutive change edges;
- an interval value storage that stores a predetermined number of successively measured interval values;
- a threshold determination unit that corrects, in response to a determination by the BMC processing circuit that the stored interval values meet a predetermined combination, a first threshold based on the stored interval values to generate a second threshold; and
- a BMC decoding unit that decodes the reception signal based on the second threshold, wherein the interval measuring unit is configured to:
  - determine the longest interval value and the second longest interval value from the stored interval values; and
  - generate the first threshold based on a representative value of the longest interval value and the second longest interval value, and a representative value of the remaining interval values.

10. The BMC processing circuit according to claim 9, wherein the interval measuring unit is further configured to verify whether a positional relation between the determined longest interval value and the determined second longest interval value is a relation expected in advance.

* * * * *